(12) United States Patent
Mast (10) Patent No.: US 12,551,208 B2
(45) Date of Patent: Feb. 17, 2026

(54) SELF-RETAINING BONE HOLDING DEVICES AND METHODS

(71) Applicant: Nicholas H. Mast, M.D., Inc., a California Medical Corporation, San Rafael, CA (US)

(72) Inventor: Nicholas H. Mast, San Rafael, CA (US)

(73) Assignee: Nicholas H. Mast, M.D., Inc., a California Medical Corporation, San Rafael, CA (US)

( * ) Notice: Subject to any disclaimer, the term of this patent is extended or adjusted under 35 U.S.C. 154(b) by 0 days.

(21) Appl. No.: 18/193,970

(22) Filed: Mar. 31, 2023

(65) Prior Publication Data

US 2023/0293167 A1 Sep. 21, 2023

Related U.S. Application Data

(63) Continuation of application No. 17/980,491, filed on Nov. 3, 2022.
(Continued)

(51) Int. Cl.
*A61B 17/04* (2006.01)
*A61F 2/08* (2006.01)

(52) U.S. Cl.
CPC ........ *A61B 17/0401* (2013.01); *A61F 2/0811* (2013.01); *A61B 2017/0409* (2013.01)

(58) Field of Classification Search
CPC ........ A61B 17/0401; A61B 2017/0409; A61B 17/80; A61B 17/8004; A61B 50/10; A61F 2/0811
See application file for complete search history.

(56) References Cited

U.S. PATENT DOCUMENTS 5,281,225 A 1/1994 Vicenzi
9,949,729 B2 * 4/2018 Foulon ............... A61B 17/0293
(Continued)

FOREIGN PATENT DOCUMENTS

KR 101672267 11/2016

OTHER PUBLICATIONS

International Search Report and Written Opinion, PCT/US2022/049445, mailed on Mar. 22, 2023.
(Continued)

*Primary Examiner* — Christopher D. Prone
(74) *Attorney, Agent, or Firm* — Greenberg Traurig (57) ABSTRACT

A system including a tensioning element and a fixation element, the tensioning element including a connection element configured to be coupled to a fixation element and an anchoring element configured to be coupled to an external fixation point, the tensioning element being operable to apply a tension between the connection element and the anchoring element, the fixation element including a first portion configured to be coupled to the tensioning element and a second portion configured to be coupled to a bone, the tensioning element and the fixation element being configured to cooperate to apply a tension between the bone and an external fixation point when the anchoring element of the tensioning element is coupled to the external fixation point, the second portion of the fixation element is coupled to the bone, and the tensioning element is operated to apply the tension, thereby retaining the bone in a fixed position.

16 Claims, 9 Drawing Sheets

Related U.S. Application Data (60) Provisional application No. 63/278,856, filed on Nov. 12, 2021.

(56) References Cited

U.S. PATENT DOCUMENTS

| | | |
|---|---|---|
| 10,231,762 B2 | 3/2019 | Steinhauer et al. |
| 2009/0131937 A1* | 5/2009 | Medoff ................. A61B 17/68 606/103 |
| 2012/0041490 A1 | 2/2012 | Jacob et al. |
| 2013/0218216 A1 | 8/2013 | Mast et al. |
| 2013/0231703 A1 | 9/2013 | Seme et al. |
| 2019/0307494 A1* | 10/2019 | McDevitt ........... A61B 17/7233 |
| 2020/0261132 A1 | 8/2020 | Vitale et al. |
| 2023/0181180 A1 | 6/2023 | Mast |

OTHER PUBLICATIONS

Extended European Search Report, EP22893574, mailed on Jul. 24, 2025.

\* cited by examiner

SELF-RETAINING BONE HOLDING DEVICES AND METHODS

CROSS-REFERENCE TO RELATED APPLICATION

The present application is a continuation application of U.S. patent application Ser. No. 17/980,491 filed Nov. 3, 2022, which claims priority to U.S. Provisional Patent Application No. 63/278,855, filed on Nov. 12, 2021 and entitled "SELF-RETAINING BONE HOLDING DEVICE," the contents of which are incorporated herein by reference in their entirety.

FIELD OF THE INVENTION

The exemplary embodiments relate to devices for retaining a bone of a patient in a desired position during an orthopedic surgical procedure. More particularly, the exemplary embodiments relate to devices for retaining a bone of a patient in a desired position, in which a retention force is applied by a mechanism that automatically applies a tension to retain the bone in the desired position.

BACKGROUND OF THE INVENTION

Reduction of fractures (e.g., repair and setting of fractured bones) is a common practice in surgical and non-surgical treatment of injuries. Surgical fracture reduction typically involves exposing a fracture, aligning opposing ends of the fracture, temporarily securing the fracture, and definitively (e.g., permanently) fixing the fracture with an appropriate mechanism (e.g., a bone plate, screws, nails, external fixation, etc.).

SUMMARY OF THE DISCLOSURE

In some embodiments, a system includes a tensioning element and a fixation element, wherein the tensioning element includes a connection element that is configured to be coupled to a fixation element and an anchoring element that is configured to be coupled to an external fixation point, wherein the tensioning element is operable to apply a tension between the connection element and the anchoring element, wherein the fixation element includes a first portion that is configured to be coupled to the tensioning element and a second portion that is configured to be coupled to bony tissue in a bone of a patient, wherein the tensioning element and the fixation element are configured to cooperate with one another so as to apply a tension between (a) bony tissue to in a bone of a patient and (b) an external fixation point, when the anchoring element of the tensioning element is coupled to the external fixation point, the second portion of the fixation element is coupled to the bony tissue in the bone of the patient, and the tensioning element is operated to apply the tension, thereby to retain the bony tissue in the bone of the patient in a fixed position with respect to the external fixation point.

In some embodiments, the tensioning element is one of (a) configured to be removably coupled to the fixation element, or (b) integrally formed with the fixation element.

In some embodiments, the second portion of the fixation element includes one of a clamp, a threaded pin, a Steinmann pin, a Kirschner wire, a Schanz screw, a Schanz pin, a suture anchor, a cerclage cable anchor, or a bone cement anchor.

In some embodiments, an angle is formed between the first portion of the fixation element and the second portion of the fixation element. In some embodiments, the angle is in a range of between 0 degrees and 180 degrees.

In some embodiments, a system also includes a further fixation element including a first portion that is configured to be coupled to the tensioning element, and a second portion that is configured to be coupled to bony tissue in a bone of a patient, wherein the tensioning element is configured to be coupled to the further fixation element such that the fixation element and the further fixation element are spaced apart from one another so as to provide rotational stability to the bony tissue in the bone of the patient. In some embodiments, the tensioning element is configured to be coupled to the further fixation element such that the fixation element and the further fixation element are spaced apart from one another by a distance that is in a range of 1 millimeter and 1000 millimeters.

In some embodiments, the system is configured to be coupled to a further external fixation point. In some embodiments, the system is configured to be coupled to the further external fixation point via one of the tensioning element or the fixation element.

In some embodiments, the fixation element also includes a further connection element that is configured to be coupled to a further tensioning element. In some embodiments, an angle is defined between the connection element and the further connection element, and the angle is in a range of between 0 degrees and 180 degrees.

In some embodiments, a kit includes at least one tensioning element and a plurality of fixation elements, wherein each of the at least one tensioning element includes a connection element that is configured to be coupled to a fixation element and an anchoring element that is configured to be coupled to an external fixation point, wherein each of the at least one tensioning element is operable to apply a tension between the connection element and the anchoring element, and wherein each of the plurality of fixation elements includes a first portion that is configured to be selectively coupled to the tensioning element and a second portion that is configured to be coupled to bony tissue in a bone of a patient, wherein the tensioning element and a selected one of the plurality of fixation elements are configured to cooperate with one another so as to apply a tension between (a) bony tissue in a bone of a patient and (b) an external fixation point, when the anchoring element of the tensioning element is coupled to the external fixation point, the second portion of the selected one of the plurality of fixation elements is coupled to the bony tissue in the bone of the patient, and the tensioning element is operated to apply the tension, thereby to retain the bony tissue in a fixed position with respect to the external fixation point.

In some embodiments, the plurality of fixation elements comprises at least a first fixation element and a second fixation element, wherein the first fixation element has a different length than the second fixation element.

In some embodiments, an angle is formed between the first portion of each of the plurality of fixation elements and the second portion of each of the plurality of fixation elements, wherein the plurality of fixation elements comprises at least a first fixation element and a second fixation element, and wherein the angle of the first fixation element is different than the angle of the second fixation element.

In some embodiments, wherein the plurality of fixation elements comprises at least a first fixation element and a second fixation element, wherein the second portion of the first fixation element is a different type of second portion than the second portion of the second fixation element.

In some embodiments, each of the plurality of fixation elements further comprises a further connection element that is configured to be coupled to a further tensioning element, wherein an angle is defined between the connection element of each of the plurality of fixation elements and the further connection element of each of the plurality of fixation elements, wherein the plurality of fixation elements comprises at least a first fixation element and a second fixation element, and wherein the angle of the first fixation element is different than the angle of the second fixation element.

In some embodiments, a method includes providing a tensioning element, wherein the tensioning element includes a connection element that is configured to be coupled to a fixation element and an anchoring element that is configured to be coupled to an external fixation point, wherein the tensioning element is operable to apply a tension between the connection element and the anchoring element; coupling the anchoring element of the tensioning element to an external fixation point; providing a fixation element, wherein the fixation element includes a first portion that is configured to be coupled to the tensioning element and a second portion that is configured to be coupled to bony tissue in a bone of a patient; coupling the first portion of the fixation element to the connection element of the tensioning element; coupling the second portion of the fixation element to bony tissue in a bone of a patient; and operating the tensioning element so as to retain the bony tissue in a desired location.

In some embodiments, the external fixation point includes a fixed location in a surgical environment. In some embodiments, the fixed location includes a point on an operating table, a point on an object in proximity to the operating table, a point on the patient, or a point on a surgical drape.

In some embodiments, one of the tensioning element or the fixation element is configured to be coupled to a further external fixation point, and the method also includes coupling the one of the tensioning element or the fixation point to the further external fixation point using one of a tensioning strap or a tensioning cable.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION OF THE DRAWINGS

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1A:
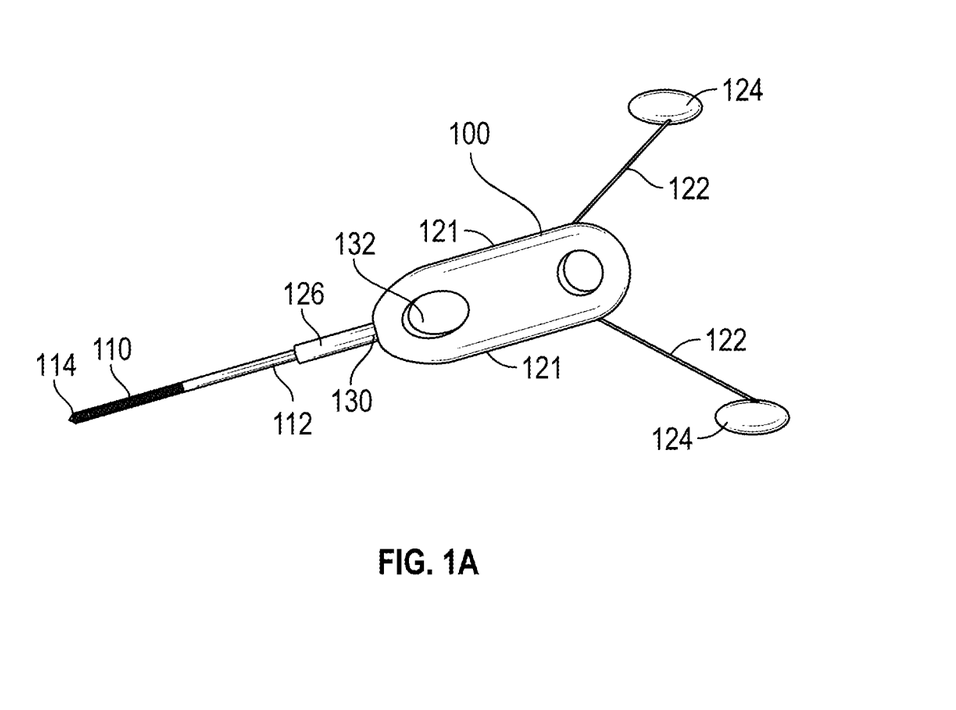
FIG. 1A shows an exemplary embodiment of a device.
Figure 1B:
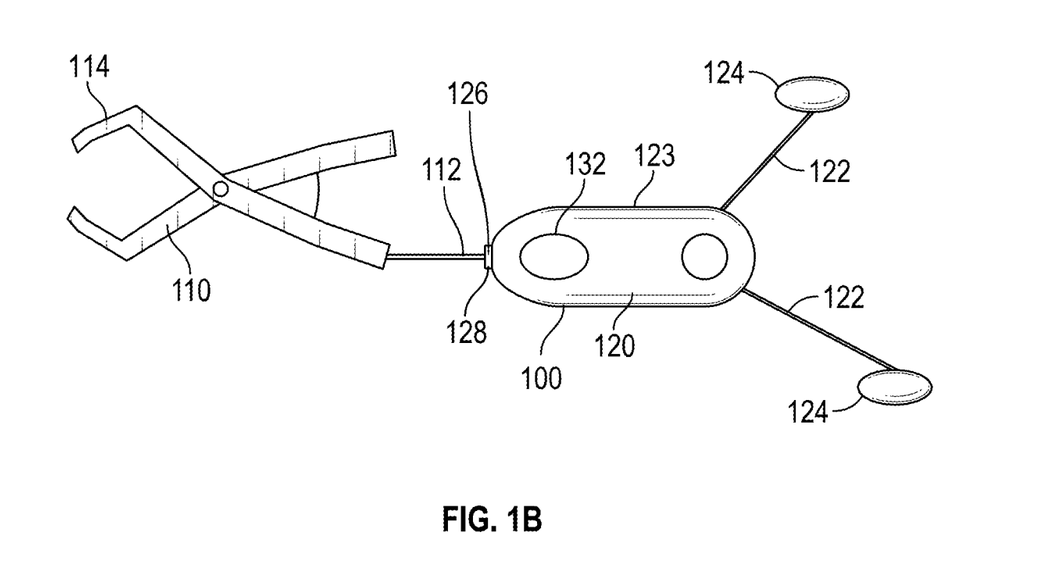
FIG. 1B shows an exemplary embodiment of a device.

FIGS. 1A and 1B illustrates elements of an exemplary device 100 that is operable to assist a clinician in provisionally reducing a fracture in a manner as described herein, or, in other use cases, in retaining a bone in a desired position in the treatment of another condition involving a bone being out of its normal position, such as a dislocation or a displacement. In some embodiments, the device 100 includes a fixation element 110 coupled to a tensioning element 120. In some embodiments, the fixation element 110 and the tensioning element 120 are permanently attached to one another (e.g., are integrally formed or otherwise fixed to one another). In some embodiments, the fixation element 110 and the tensioning element 120 are removably attached to one another. In some embodiments, the tensioning element 120 is configured to be removably coupled to a variety of different ones of the fixation element 110 (e.g., interchangeably, as elements of a kit, etc.). In some embodiments, the fixation element 110 and the tensioning element 120 are configured to be removably coupled to one another using a quick connect. In some embodiments, the fixation element 110 includes a first portion 112 that is configured to be coupled to (e.g., removably attached to or integrally formed with) the tensioning element 120. In some embodiments, the tensioning element 120 includes a connection element 126 that is configured to be coupled to (e.g., removably attached to or integrally formed with) the fixation element 110. In some embodiments, the connection element 126 includes a slot 128 that is formed in one end of the tensioning element 120, and the first portion 112 of the fixation element 110 is configured to be positioned within the slot 128. In some embodiments, the connection element 126 includes a locking mechanism 130 that is operable by a user to releasably secure an object (e.g., the fixation element 110 as described above) within the slot 128. In the embodiment shown in FIGS. 1A and 1B, the locking mechanism 130 includes a handle that is rotatable by a user to tighten the slot 128. In some embodiments, the locking mechanism 130 includes a threaded lock. In some embodiments, the locking mechanism 130 includes a ratcheting lock. In some embodiments, the first portion 112 of the fixation element 110 is configured to be coupled (e.g., removably attached to or integrally formed with) a housing 121 of the tensioning element 120. In some embodiments, the first portion 112 of the fixation element is configured to be coupled to the housing 121 of the tensioning element 120 using a clamp, a threaded fastener, or another type of mechanical fastener.

In some embodiments, the fixation element 110 includes a second portion 114 that includes a mechanical device that is operable to be removably coupled to one side of a fracture (e.g., to bony tissue of a fractured bone to one side of the fracture) in order to allow a force to be applied to the side of the fracture via the fixation element 110. In some embodiments, the second portion 114 of the fixation element 110 includes a clamp. In some embodiments, the second portion 114 of the fixation element 110 includes a threaded pin. In some embodiments, the second portion 114 of the fixation element 110 includes a Steinmann pin. In some embodiments, the second portion 114 of the fixation element 110 includes a Kirschner wire (e.g., a "K-wire"). In some embodiments, the second portion 114 of the fixation element 110 includes a Schanz screw. In some embodiments, the second portion 114 of the fixation element 110 includes a Schanz pin. In some embodiments, the second portion 114 of the fixation element 110 includes a securing point that is configured to receive sutures to thereby fix the fixation element 110 to a bone using such sutures (e.g., a suture anchor). In some embodiments, the second portion 114 of the fixation element 110 includes a securing point that is configured to receive cerclage cables/wires to thereby fix the fixation element 110 to a bone using such cerclage cables/wires (e.g., a cerclage cable anchor). In some embodiments, the second portion 114 of the fixation element 110 includes a surface (e.g., a generally flat surface) that is configured to receive bone cement or biologic glue, to thereby fix the fixation element 110 to a bone using such bone cement or biologic glue (e.g., a bone cement anchor). In some embodiments, the second portion 114 of the fixation element 110 includes another type of fastening or securing mechanism that is operable to removably secure the fixation element to a bone in a manner that maintains constant respective positions thereof. In the embodiment shown in FIG. 1A, the second portion 114 of the fixation element 110 includes a Schanz pin. In the embodiment shown in FIG. 1B, the second portion 114 of the fixation element 110 includes a clamp.

In some embodiments, the tensioning element 120 is operable to apply a force to the fixation element 110 and thereby to apply a force to the side of the fracture to which the fixation element is coupled. In some embodiments, the tensioning element 120 includes a mechanical retracting system. In some embodiments, the tensioning element 120 includes at least one elongate element 122 (e.g., a wire) extending from the housing 121 of the tensioning element 120. In some embodiments, such as shown in FIGS. 1A and 1B, the tensioning element 120 includes two of the elongate elements 122. In some embodiments, each of the at least one elongate element 122 is coupled to at least one anchoring element 124. In some embodiments, each of the at least one anchoring element 124 is configured to be removably coupled to an external fixation point (e.g., a fixed location in a surgical environment, such as a point on an operating table, a point on an object in proximity to an operating table, a point on a patient, a point on a surgical drape, etc.). In some embodiments, at least one of the at least one anchoring element 124 includes a hook. In some embodiments, at least one of the at least one anchoring element 124 includes a clamp. In some embodiments, at least one of the at least one anchoring element 124 includes a ring. In some embodiments, at least one of the at least one anchoring element 124 includes a threaded anchor. In some embodiments, the tensioning element 120 is operable to tension each of the at least one elongate element 122, thereby to apply a tension force between each of the at least one anchoring element 124 and the fixation element 110, and thereby to apply the tension force between the fixation element 110 and an external fixation point to which each of the at least one anchoring element 124 is coupled. In some embodiments, such as shown in FIGS. 1A and 1B, the tensioning element 120 includes an actuator 132 that is operable by a user to control the application of tension by the tensioning element 120 to each of the at least one elongate element 122. In some embodiments, the actuator 132 is a button. In some embodiments, the tensioning element 120 is configured such that, when the button is pressed, each of the at least one elongate element 122 can be freely extended away from the housing 123 of the tensioning element 120, and such that, when the button is released, the tensioning element 120 applies a tension force to each of the at least one elongate element 122 as described above.

Figure 3A:
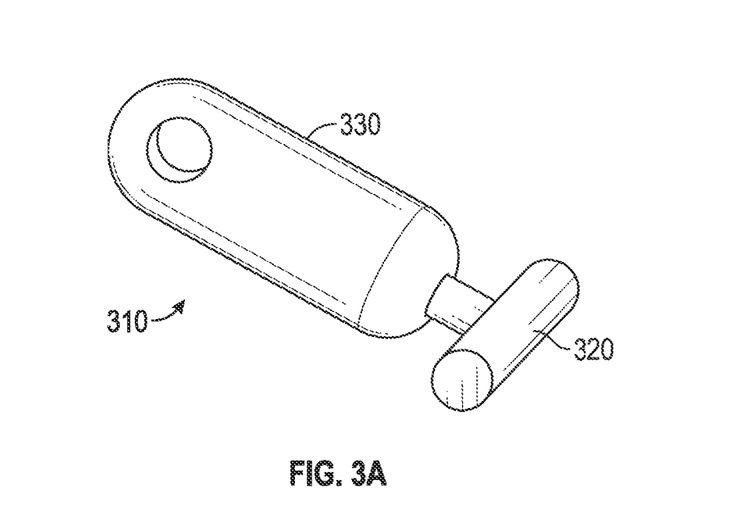
FIG. 3A shows an exemplary embodiment of a tensioning device.
Figure 3B:
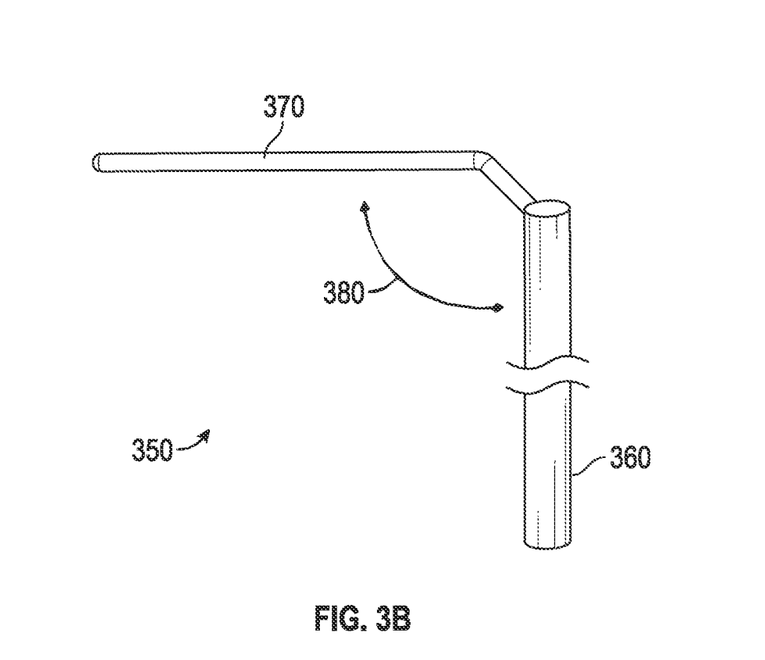
FIG. 3B shows an exemplary embodiment of a fixation element.

In some embodiments, a tensioning element is configured to allow for removable and selective coupling to fixation elements of differing sizes and/or of differing shapes. FIGS. 3A and 3B show such exemplary embodiments. In the embodiment shown in FIG. 3A, a tensioning element 310 includes a barrel 320. In some embodiments, the barrel 320 is configured to accept fixation elements of varying sizes. In some embodiments, the barrel 320 includes a threaded engagement, a Morse taper, a cotter pin, and/or another suitable mechanical fastening mechanism operable to selectively receive a fixation element. In some embodiments, the tensioning element 310 includes a tensioning portion 330. In some embodiments, the tensioning portion 330 is operable to apply a force in substantially the same manner as described above with reference to the tensioning element 120. In some embodiments, rather than the barrel 320, an exemplary tensioning element 310 includes another type of fixation mechanism that is operable to secure the positional, angular, and rotational relationship between the tensioning element 310 and a fixation element (e.g., a clamp, a ratcheting lock, etc.).

FIG. 3B shows an exemplary fixation element 350. In some embodiments, the fixation element 350 includes a first portion 360 that is configured to be removably coupled to a tensioning element, such as by coupling to the barrel 320 of the tensioning element 310. In some embodiments, various ones of the fixation element 350 are provided together with one another (e.g., as part of a kit) having first portions 360 of varying lengths. In some embodiments, each of the lengths is a length that is suitable for use in an operating environment to provide the desired fixation. For example, in some embodiments, each of the lengths is in a range of between 1 centimeter and 100 centimeters. In some embodiments, each of the lengths is in a range of between 1 centimeter and 15 centimeters. In some embodiments, each of the lengths is in a range of between 1 centimeter and 10 centimeters. In some embodiments, each of the lengths is in a range of between 1 centimeter and 5 centimeters. In some embodiments, each of the lengths is in a range of between 5 centimeter and 10 centimeters. In some embodiments, each of the lengths is in a range of between 10 centimeters and 15 centimeters. In some embodiments, each of the lengths is in a range of between 5 centimeter and 15 centimeters. In some embodiments, the fixation element 350 has a first portion 360 having a length that is adjustable (e.g., preoperatively or intraoperatively) and can be secured so as to remain at a desired length when in use. In some embodiments, the fixation element 350 includes a second portion 370 that is configured to be removably coupled to a bone, e.g., to one side of a fracture. In some embodiments, the second portion 370 is configured to be removably coupled to a bone in any of the various manners discussed above with reference to the fixation element 110. In some embodiments, various ones of the fixation element 350 may be provided together with one another (e.g., as part of a kit) having second portions 370 that are configured to be removably coupled to a bone in different manners.

In some embodiments, the first portion 360 and the second portion 370 are relatively positioned so as to define an angle 380 with respect to one another. In some embodiments, the angle 380 is between 0 degrees and 180 degrees, or is between 0 degrees and 150 degrees, or is between 0 degrees and 120 degrees, or is between 0 degrees and 90 degrees, or is between 0 degrees and 60 degrees, or is between 0 degrees and 30 degrees, or is between 30 degrees and 180 degrees, or is between 30 degrees and 150 degrees, or is between 30 degrees and 120 degrees, or is between 30 degrees and 90 degrees, or is between 30 degrees and 60 degrees, or is between 60 degrees and 180 degrees, or is between 60 degrees and 150 degrees, or is between 60 degrees and 120 degrees, or is between 60 degrees and 90 degrees, or is between 90 degrees and 180 degrees, or is between 90 degrees and 150 degrees, or is between 90 degrees and 120 degrees, or is between 120 degrees and 180 degrees, or is between 120 degrees and 150 degrees, or is between 150 degrees and 180 degrees, or is 5 degrees, or is 10 degrees, or is 15 degrees, or is 20 degrees, or is 25 degrees, or is 30 degrees, or is 35 degrees, or is 40 degrees, or is 45 degrees, or is 50 degrees, or is 55 degrees, or is 60 degrees, or is 65 degrees, or is 70 degrees, or is 75 degrees, or is 80 degrees, or is 85 degrees, or is 90 degrees, or is 95 degrees, or is 100 degrees, or is 105 degrees, or is 110 degrees, or is 115 degrees, or is 120 degrees, or is 125 degrees, or is 130 degrees, or is 135 degrees, or is 140 degrees, or is 145 degrees, or is 150 degrees, or is 155 degrees, or is 160 degrees, or is 165 degrees, or is 170 degrees, or is 175 degrees, or is 180 degrees. In some embodiments, various ones of the fixation element 350 may be provided together with one another (e.g., as part of a kit) different angles 380. In some embodiments, the fixation element 350 has an angle 380 that is adjustable (e.g., preoperatively or intraoperatively) and can be secured so as to remain at a desired angle when in use.

Figure 4A:
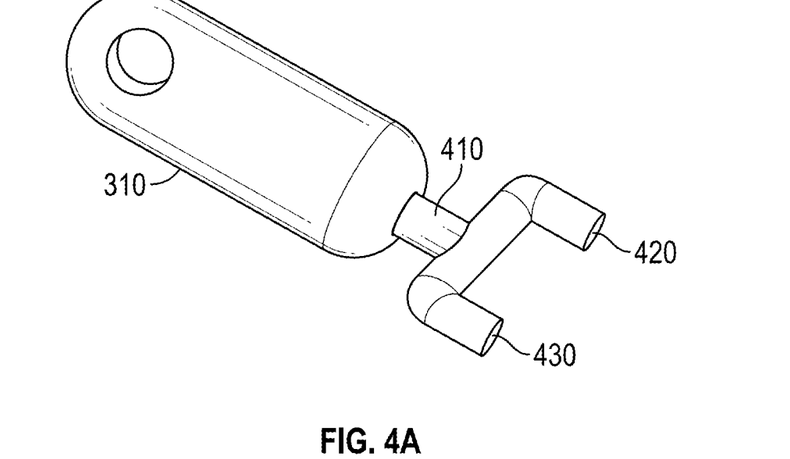
FIG. 4A shows an exemplary embodiment of a fixation device and a tensioning device.
Figure 4B:
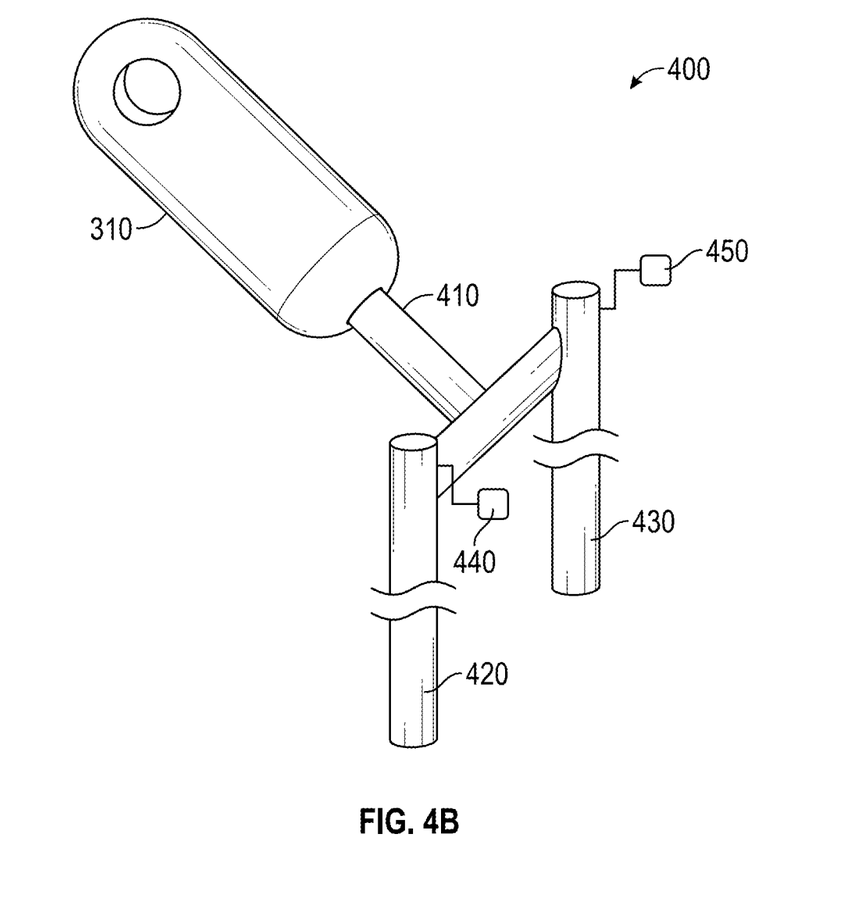
FIG. 4B shows an exemplary embodiment of a fixation device and a tensioning device.

In some embodiments, a device includes more than one fixation element. FIGS. 4A and 4B show an embodiment of a device 400 that includes two fixation elements that are spaced apart from one another. In other embodiments, a device includes a different number of fixation elements, e.g., three fixation elements, four fixation elements, five fixation elements, etc. In some embodiments, inclusion of more than one fixation element provides additional rotational stability to the device as compared to a single fixation element. In some embodiments, the device 400 includes a first portion 410 that is configured to be removably coupled to a tensioning element. In some embodiments, two second portions 420, 430 (e.g., two fixation elements) extend away from the first portion 410. In some embodiments, the second portions 420, 430 extend away from the first portion 410 in substantially the same direction as one another (e.g., are generally parallel to one another). In some embodiments, the second portions 420, 430 are separated from one another (e.g., spaced apart from one another) by a distance that is sufficient to provide rotational stability to the device 400. In some embodiments, the distance between the second portions 420, 430 is small enough for the second portions 420, 430 to be secured to separate points in a small bone, such as a metacarpal or phalanx bone in a hand. In such cases, the distance between the second portions 420, 430 may be as small as 1 millimeter. In some embodiments, the distance between the second portions 420, 430 is large enough for the second portions 420, 430 to be secured to opposite ends of two opposing bones of a large joint, such as for one of the second portions 420 to be secured to a proximal end of a femur and the other of the second portions 430 to be secured to a distal end of a tibia, to thereby secure both bones in position with respect to one another. In such cases, the distance between the second portions 420, 430 may be as large as 1 meter. In some embodiments, the distance is between 1 millimeter and 1 meter. In some embodiments, the distance is between 1 millimeter and 750 millimeters. In some embodiments, the distance is between 1 millimeter and 500 millimeters. In some embodiments, the distance is between 1 millimeter and 250 millimeters. In some embodiments, the distance is between 250 millimeters and 1000 millimeters. In some embodiments, the distance is between 250 millimeters and 750 millimeters. In some embodiments, the distance is between 250 millimeters and 500 millimeters. In some embodiments, the distance is between 500 millimeters and 1000 millimeters. In some embodiments, the distance is between 500 millimeters and 750 millimeters. In some embodiments, the distance is between 750 millimeter and 1000 millimeters. In some embodiments, the distance is between 1 millimeter and 400 millimeters. In some embodiments, the distance is between 1 millimeter and 300 millimeters. In some embodiments, the distance is between 1 millimeter and 200 millimeters. In some embodiments, the distance is between 1 millimeter and 100 millimeters. In some embodiments, the distance is between 100 millimeters and 400 millimeters. In some embodiments, the distance is between 100 millimeters and 300 millimeters. In some embodiments, the distance is between 100 millimeters and 200 millimeters. In some embodiments, the distance is between 200 millimeters and 400 millimeters. In some embodiments, the distance is between 200 millimeter and 300 millimeters. In some embodiments, the distance is between 100 millimeters and 200 millimeters. In FIG. 4A, the device 400 is shown coupled to the tensioning element 310.

FIG. 4B shows an alternate perspective of the device 400 and the tensioning element 310 shown in FIG. 4A. In some embodiments, the second portions 420, 430 are removably coupled to the first portion 410. In some embodiments, fastening elements 440, 450 are provided to removably couple the respective second portions 420, 430 to the first portion 410. In some embodiments, the fastening elements 440, 450 are thumb screws. In some embodiments, the fastening elements 440, 450 are Association for Osteosynthesis (AO) style quick connects. In some embodiments, the fastening elements 440, 450 are ratcheting connectors. In some embodiments, the second portions 420, 430 are provided in various lengths so as to accommodate differing conditions such as patient anatomy (e.g., body size), surgeon preferences, operating theater layout, etc.

Figure 5A:
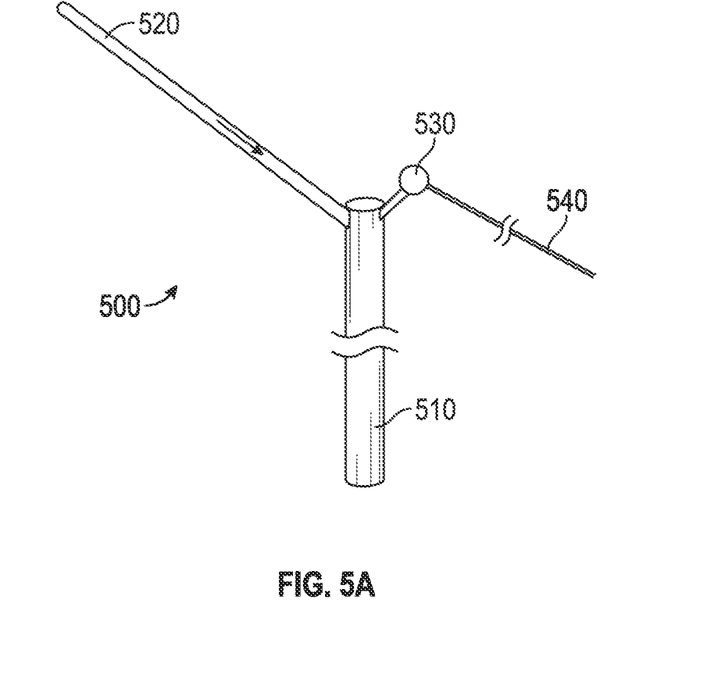
FIG. 5A shows an exemplary embodiment of a fixation device.

In some embodiments, a device is configured to be attached to a supplemental tensioning element (e.g., a tensioning strap or tensioning cable) to provide a third fixation point (e.g., in addition to the two respective fixation points of the fixation element 110 and the tensioning element 120 described above) and to be independently tensioned. In some embodiments, a device includes a fixation element that is configured to be attached to a supplemental fixation element. FIG. 5A shows an exemplary fixation element 500. In some embodiments, the fixation element 500 includes a first portion 510 that is substantially similar to the first portion 360 of the fixation element 350 described above. In some embodiments, the fixation element 500 includes a second portion 520 that is substantially similar to the second portion 370 of the fixation element 350 described above. In some embodiments, the fixation element 500 includes a supplemental tension anchor 530 that is positioned between the first portion 360 and the second portion 370. In some embodiments, the supplemental tension anchor 530 is configured to be coupled (e.g., removably coupled) to a supplemental tensioning element (e.g., a tensioning strap, a tensioning cable, a tensioning rod, etc.). In some embodiments, the supplemental tension anchor 530 includes a D-ring, an O-shaped clasp, a substantially triangular clasp, a carabiner, or any other mechanical coupling element that is suitable for connection to a supplemental tensioning element (e.g., a tensioning strap, a tensioning cable, a strap having hook-and-loop fasteners, et). In the embodiment shown in FIG. 5A, the supplemental tension anchor 530 is an O-shaped clasp and is shown coupled to a tensioning cable 540, but it will be apparent to those of skill in the art that other embodiments are also possible as described herein.

Figure 5B:
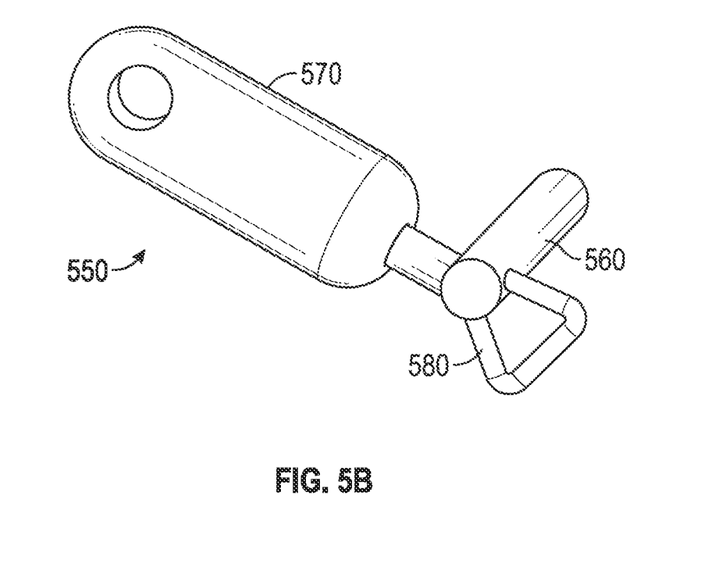
FIG. 5B shows an exemplary embodiment of a tensioning device.

FIG. 5B shows an exemplary tensioning element 550. In some embodiments, the tensioning element 550 includes a barrel 560 that is configured to engage a fixation element in substantially the same manner described above with reference to the barrel 320. In some embodiments, the tensioning element 550 includes a tensioning element 570 that is operable to apply a force in substantially the same manner as described above with reference to the tensioning element 120. In some embodiments, the tensioning element 550 includes a supplemental tension anchor 580. In some embodiments, the supplemental tension anchor 580 is configured to be coupled (e.g., removably coupled) to a supplemental tensioning element (e.g., a tensioning strap or a tensioning cable) in substantially the same manner described above with reference to the supplemental tension anchor 530. In the embodiment shown in FIG. 5B, the supplemental tension anchor 580 is a substantially triangular clasp, but it will be apparent to those of skill in the art that other embodiments are also possible as described herein.

Figure 6A:
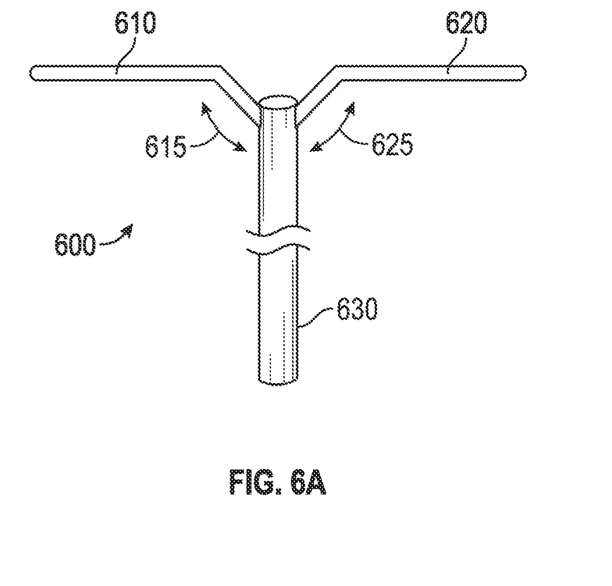
FIG. 6A shows an exemplary embodiment of a fixation device.

In some embodiments, a fixation element is configured to engage more than one tensioning element. FIG. 6A shows an exemplary fixation element 600 that is configured to engage more than one tensioning element. In the embodiment shown in FIG. 6A, the fixation element 600 is configured to engage two tensioning elements, but in other embodiments, a fixation element is configured to engage a different number of tensioning elements, e.g., three tensioning elements, four tensioning elements, etc. In some embodiments, the fixation element 600 includes a first portion 610 that is configured to be removably coupled to a first tensioning element and a second portion 620 that is configured to be removably coupled to a second tensioning element. In some embodiments, each of the first portion 610 and the second portion 620 is configured to be removably coupled to a respective tensioning element by a mechanism such as the barrel 320 described above with reference to FIG. 3A. In some embodiments, the fixation element 600 includes a third portion 630. In some embodiments, the third portion 630 is operable to be removably coupled to one side of a fracture (e.g., to bone to one side of a fracture) in any of the manners described above with reference to the second portion 114 of the fixation element 110. In some embodiments, a first angle 615 is formed between the first portion 610 and the third portion 630, and a second angle 625 is formed between the second portion 620 and the third portion 630. In some embodiments, each of the first angle 615 and the second angle 625 has any of the angle values described above with reference to the angle 380. In some embodiments, the first angle 615 and the second angle 625 are the same angle. In some embodiments, the first angle 615 and the second angle 625 are different angles. In some embodiments, various ones of the fixation element 600 are provided together with one another (e.g., as part of a kit) having differing values of the first angle 615, differing values of the second angle 625, and/or different lengths of the third portion 630. In some embodiments, the fixation element 600 has a first angle 615, second angle 625, and/or length of the third portion 630 that is/are adjustable (e.g., preoperatively or intraoperatively) and can be secured so as to remain at a desired angle and/or length when in use.

Figure 6B:
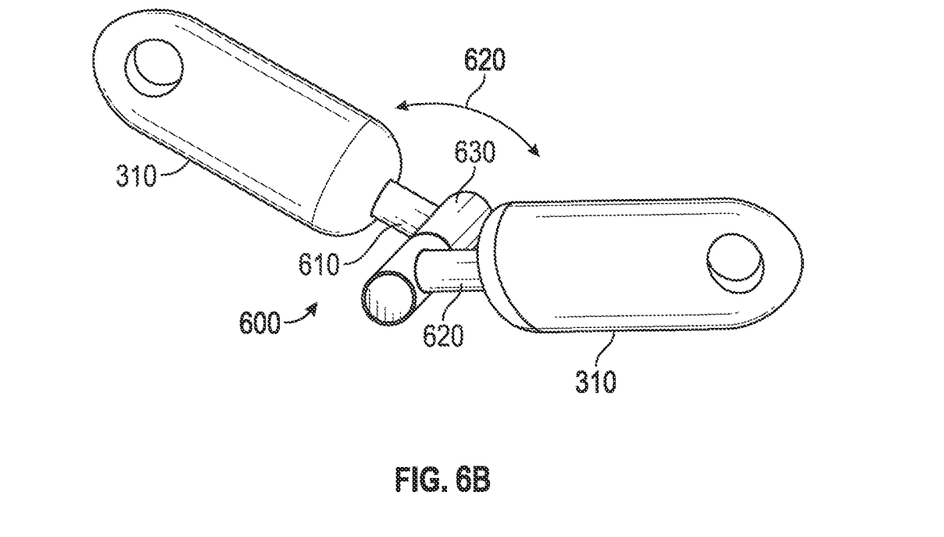
FIG. 6B shows the exemplary fixation device shown in FIG. 6A as used in connection with two exemplary tensioning devices.

FIG. 6B shows the fixation element 600 used in conjunction with two of the tensioning element 310. In some embodiments, a third angle 640 is defined between the first portion 610 and the second portion 620, as shown in FIG. 6B. In some embodiments, the third angle 640 has any of the angle values described above with reference to the angle 380. In some embodiments, various ones of the fixation element 600 are provided together with one another (e.g., as part of a kit) having differing values of the third angle 640. In some embodiments, a kit including various ones of the fixation element 600 having different values of the first angle 615, the second angle 625, the third angle 640, and/or the length of the third portion 630 enables a surgeon to select a suitable fixation element 600 to fit conditions such as the patient's anatomy, the size and layout of the operating room, the surgeon's preferred location for an external anchoring point, etc. In some embodiments, the fixation element 600 has a first angle 615, second angle 625, third angle 640, and/or length of the third portion 630 that is/are adjustable (e.g., preoperatively or intraoperatively) and can be secured so as to remain at a desired angle and/or length when in use.

Figure 7A:
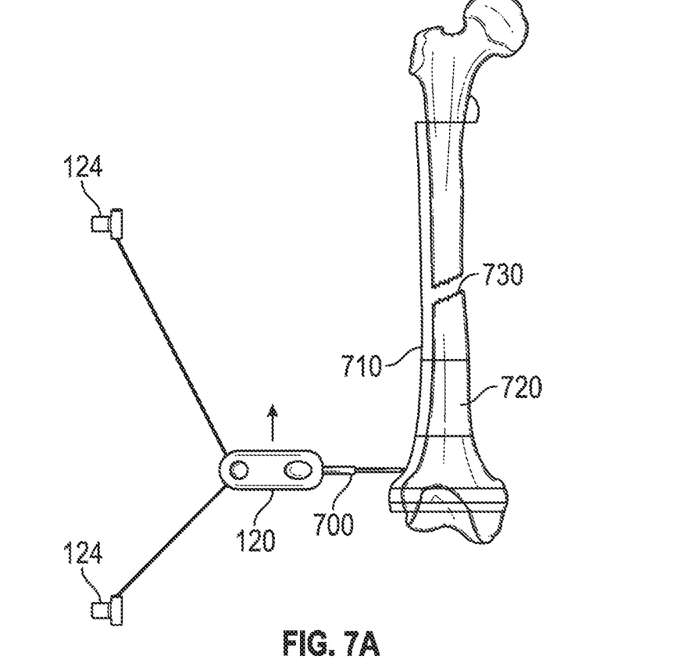
FIG. 7A shows an exemplary fixation device and an exemplary tensioning device used in conjunction with a bone repair device at a first stage of a process for repair of a fracture.

In some embodiments, a fixation element as described herein is configured to be coupled to a bone repair device (e.g., a bone plate or nail) that is in turn anchored to a bone for purposes of bone fixation, rather than the fixation element being directly coupled to a bone. FIGS. 7A-7D show the use of such a fixation element together with a tensioning element as described above. In FIG. 7A, a fixation element 700 that is configured to be coupled to a bone repair device is coupled to a tensioning element 120 in any of the manners described above, and the tensioning element 120 is in turn coupled to two external anchoring elements 124. Also as shown in FIG. 7A, the fixation element 700 is coupled to a bone repair device 710 that is in turn coupled to a bone segment 720 to one side of a fracture 730. In some embodiments, the fixation element 700 is coupled to the bone repair device 710 using a screw, clamp, adapter, or other mechanical fixation technique. In the embodiment shown in FIG. 7A, the bone segment 720 is a distal fragment of a femur, and the bone repair device 710 is a bone plate that is configured to fixed to the exterior surface of the distal fragment of the femur. However, in other embodiments, the bone segment can be any other portion of a bone that it may be desirable to retain in a fixed position, and the bone repair device can be any other type of bone repair device, e.g., any other type of plate, nail, etc.

Figure 7B:
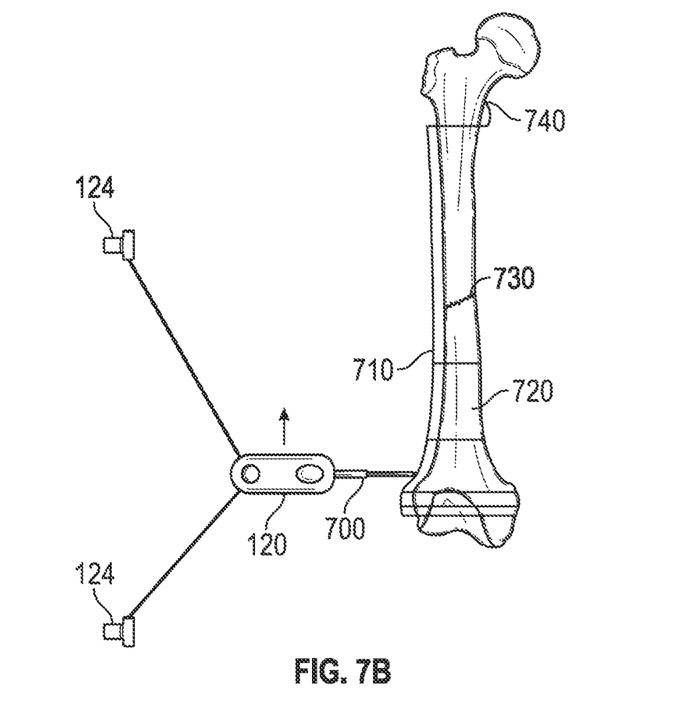
FIG. 7B shows the exemplary fixation device and the exemplary tensioning device shown in FIG. 7A at a second stage of a process for repair of a fracture.

As shown in FIG. 7B, in the next step for use of the fixation element 700 as described above, the tensioning element 120 is repositioned so as to bring the bone segment 720 into proximity with a bone segment 740 to an opposite side of the fracture 730, thereby provisionally reducing the fracture 730. Once positioned in this manner, the combination of the tensioning element 120 and the fixation element 700 acts to retain the bone segment 720 in its desired location in a similar manner to that described above with reference to exemplary embodiments in which a fixation element is secured directly to a bone.

Figure 7C:
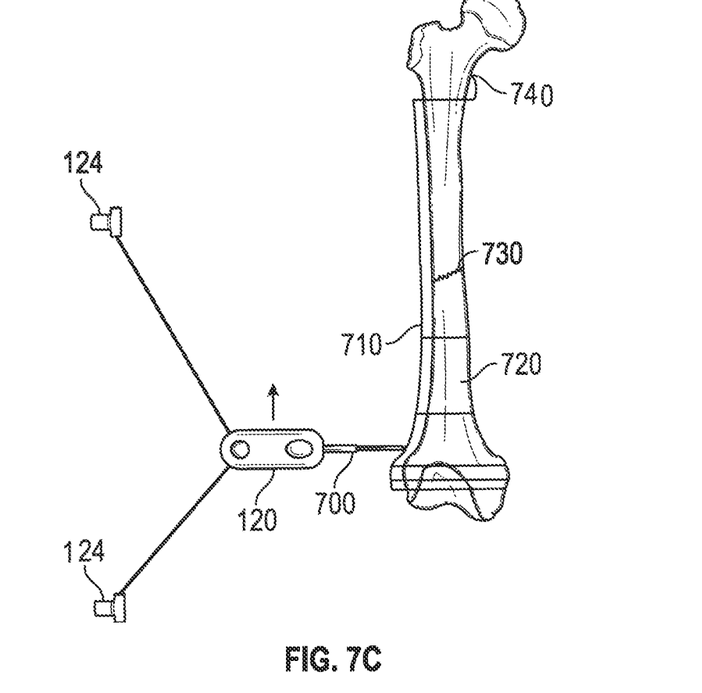
FIG. 7C shows the exemplary fixation device and an exemplary tensioning device shown in FIG. 7A at a third stage of a process for repair of a fracture.
Figure 7D:
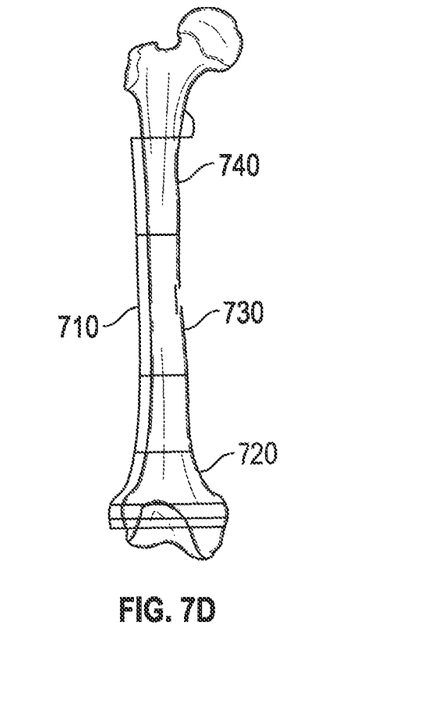
FIG. 7D shows a repaired bone following repair of a fracture as accomplished using the exemplary fixation device and the exemplary tensioning device shown in FIG. 7A.

As shown in FIG. 7C, while the combination of the tensioning element 120 and the fixation element 700 acts to retain the bone segment 720 in its desired location, a surgeon couples the bone repair device 710 to the bone segment 740 in a manner that is appropriate for the type of the bone repair device 710. For example, in an embodiment in which the bone repair device 710 is a bone plate, as shown in FIG. 7C, the surgeon secures the bone repair device 710 to the bone segment 740 using screws or other suitable fasteners. Following such securing, the fixation element 700 is removed from the bone repair device 710, leaving the bone repair device 710 in place as shown in FIG. 7D.

Figure 2A:
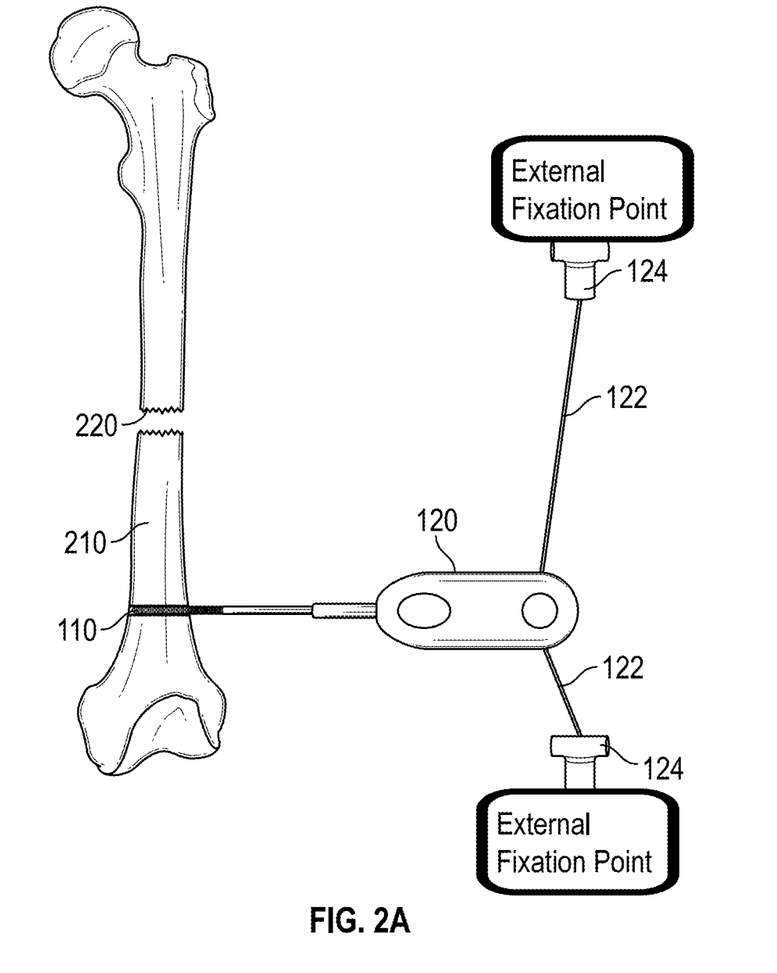
FIG. 2A shows a first stage of use of the exemplary device of FIG. 1A to reduce a fracture.

In some embodiments, the devices descried herein are used as follows. The process below will be described with specific reference to the device 100, but in other embodiments, other embodiments of devices described herein are used in substantially the same manner. In some embodiments, a clinician (e.g., a surgeon) attaches the at least one anchoring element 124 to a suitable fixed anchoring location (e.g., an edge of an operating table). In some embodiments, the clinician attaches the fixation element 110 to bony tissue to one side of a fracture (e.g., to a patient's bone to one side of a fracture in the bone). For example, in embodiments in which the fixation element 110 is a clamp, the clinician clamps the fixation element 110 to the side of the fracture. In embodiments in which the fixation element 110 is a pin, the clinician places the pin in the patient's bone to the side of the fracture. FIG. 2A shows the device 100 having the fixation element 110 fixed to one side 210 of a fracture 220 and two of the anchoring element 124 fixed to anchoring locations.

Figure 2B:
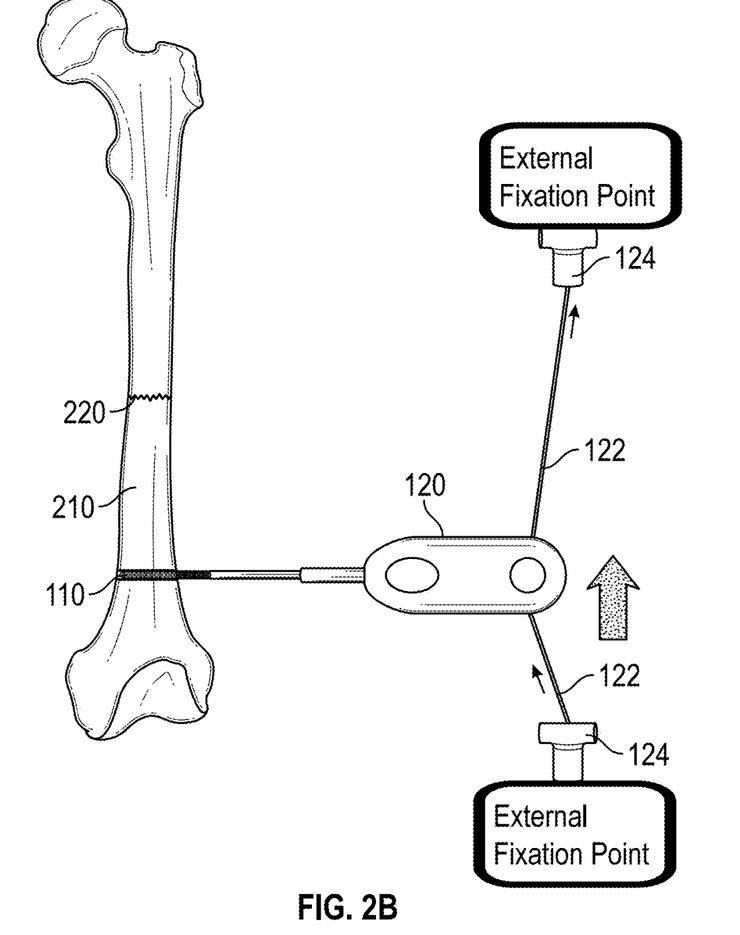
FIG. 2B shows a second stage of use of the exemplary device of FIG. 1A to reduce a fracture.

In some embodiments, the clinician operates the tensioning element 120 to apply a desired tension along the at least one elongate element 122. In some embodiments, application of the tension along the at least one elongate element 122 causes a desired force to be applied to the fixation element 110, and thereby to the side 210 of the fracture 220 (e.g., the tensioning element 120 and the fixation element 110 cooperate to apply the force). In this manner, the side 210 can be positioned in a manner so as to provisionally reduce the fracture 220. In some embodiments, the clinician may then complete reduction of the fracture by application of a bone plate, bone screws, or the like. FIG. 2B shows the device 100 following operation of the tensioning element 120 to reduce the fracture 220. FIG. 2B also shows arrows indicating the application of forces through operation of the tensioning element 120 to thereby provisionally reduce the fracture 220.

In embodiments in which multiple fixation elements are provided as part of a kit (e.g., including different fixation elements having different lengths, different angles, different fixation mechanisms, etc.), a method also includes selecting a suitable fixation element.

In the embodiment shown in FIGS. 2A and 2B, the device 100 is shown as applied to reduce a fracture in a human femur. However, in other embodiments, the device 100 adapted to repair a fracture in any other bone. In other embodiments, the device 100 may also be used in a surgical setting to apply a force to other non-bony anatomy of a patient.

In some embodiments, an exemplary device as described herein is operable to be secured to one side of a fracture, and to allow a clinician (e.g., a surgeon) to manipulate the secured side of the fracture into a desired position for temporary reduction. The exemplary embodiments are then operable to retain the fracture in the temporary reduction position while permanent fixation is performed. For example, in some embodiments, an exemplary device may allow a surgeon to perform fracture reduction with little to no assistance from other clinical personnel, such as is often required in unscheduled trauma situations.

While a number of embodiments of the present invention have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A method, comprising:
   providing a tensioning element, wherein the tensioning element comprises:
      a connection element that is configured to be coupled to a fixation element, and
      an anchoring element that is configured to be coupled to a fixed location in a surgical environment,
      wherein the tensioning element is operable to apply a tension between the connection element and the fixed location in the surgical environment so as to retain the connection element in a fixed position with respect to the fixed location;
   coupling the anchoring element of the tensioning element to a fixed location in a surgical environment;
   providing the fixation element, wherein the fixation element comprises:
      a first portion that is configured to be coupled to the tensioning element, and a second portion that is configured to be coupled to bony tissue in a bone of a patient;

coupling the first portion of the fixation element to the connection element of the tensioning element;

coupling the second portion of the fixation element to the bony tissue in the bone of the patient, wherein the second portion of the fixation element is coupled to the bony tissue at a location to one side of a fracture in the bone;

operating the tensioning element so as to retain the bony tissue in a fixed position with respect to the fixed location in the surgical environment, wherein the position is a location for temporary reduction of the fracture; and applying a bone repair device to thereby permanently fix the fracture while the tensioning element is operated to retain the bony tissue in the location for temporary reduction of the fracture, wherein the bone repair device is a separate device from the tensioning element.

2. The method of claim 1, wherein the fixed location comprises a point on an operating table, a point on an object in proximity to the operating table, a point on the patient, or a point on a surgical drape.

3. The method of claim 1,
wherein one of the tensioning element or the fixation element is configured to be coupled to a further external fixation point, and
wherein the method further comprises coupling the one of the tensioning element or the fixation point to the further external fixation point using one of a tensioning strap or a tensioning cable.

4. The method of claim 1, wherein the second portion of the fixation element comprises one of a clamp, a threaded pin, a Steinmann pin, a Kirschner wire, a Schanz screw, a Schanz pin, a suture anchor, a cerclage cable anchor, or a bone cement anchor.

5. The method of claim 1, wherein an angle is formed between the first portion of the fixation element and the second portion of the fixation element.

6. The method of claim 5, wherein the angle is in a range of between 0 degrees and 180 degrees.

7. The method of claim 1, further comprising:
providing a further fixation element, wherein the further fixation element comprises:
a first portion that is configured to be coupled to the tensioning element, and
a second portion that is configured to be coupled to bony tissue in a bone of a patient;
coupling the first portion of the further fixation element to the connection element of the tensioning element in a manner such that the first portion of the fixation element and the first portion of the further fixation element are spaced apart from one another; and
coupling the second portion of the further fixation element to bony tissue in the bone of the patient,
wherein the fixation element and the further fixation element cooperate to provide rotational stability to the bone of the patient.

8. The method of claim 7, wherein the first portion of the fixation element and the first portion of the further fixation element are spaced apart from one another by a distance that is in a range of 1 millimeter and 1000 millimeters.

9. The method of claim 1, wherein the fixation element comprises a third portion that is configured to be coupled to a further tensioning element, and wherein the method further comprises:
providing a further tensioning element, wherein the further tensioning element comprises:
a connection element that is configured to be coupled to a fixation element, and
an anchoring element that is configured to be coupled to an external fixation point,
wherein the further tensioning element is operable to apply a tension between the connection element and the anchoring element;
coupling the anchoring element of the further tensioning element to a further external fixation point,
wherein the further external fixation point comprises a fixed location in a surgical environment;
coupling the third portion of the fixation element to the connection element of the further tensioning element; and
operating the further tensioning element so as to retain the bony tissue in the desired location.

10. The method of claim 9, wherein an angle is defined between the first portion of the fixation element and the third portion of the fixation element, and wherein the angle is in a range of between 0 degrees and 180 degrees.

11. The method of claim 1, further comprising:
selecting the fixation element from a kit, wherein the kit comprises a plurality of the fixation element.

12. The method of claim 11, wherein the plurality of the fixation element includes a first fixation element and a second fixation element, and wherein the first fixation element has a different length than the second fixation element.

13. The method of claim 11,
wherein an angle is formed between the first portion of each of the plurality of the fixation elements and the second portion of each of the plurality of the fixation elements,
wherein the plurality of the fixation element comprises at least a first fixation element and a second fixation element,
wherein the angle of the first fixation element is different than the angle of the second fixation element.

14. The method of claim 11,
wherein the plurality of the fixation element comprises at least a first fixation element and a second fixation element, and
wherein the second portion of the first fixation element is a different type of second portion than the second portion of the second fixation element.

15. The method of claim 1, wherein the bone repair device comprises at least one of a bone plate, a screw, or a nail.

16. The method of claim 1, wherein the bone is a femur.

* * * * *